Nov. 26, 1968 W. A. BERTOLINI 3,413,016
MULTIPLE CHASSIS AND CONTAINER SYSTEM
Filed Nov. 24, 1967 4 Sheets-Sheet 1
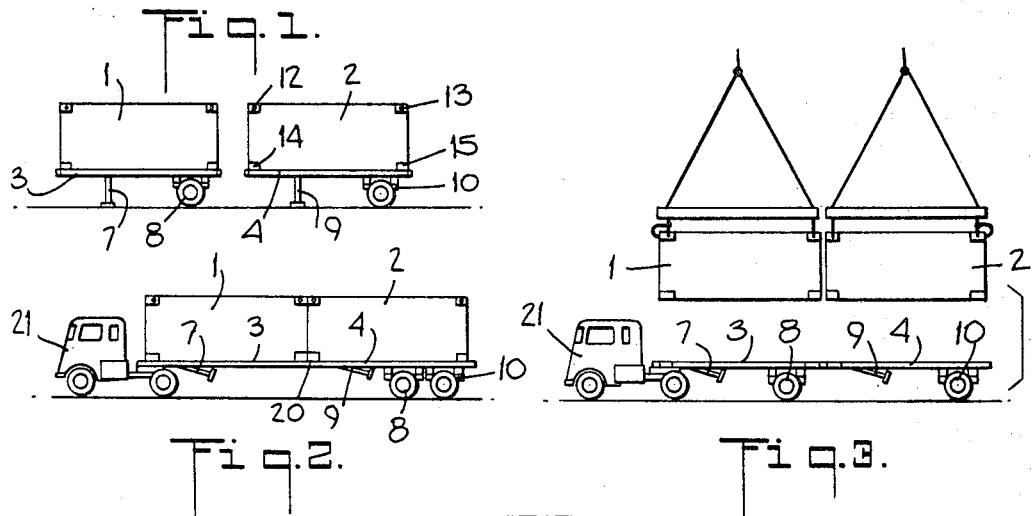
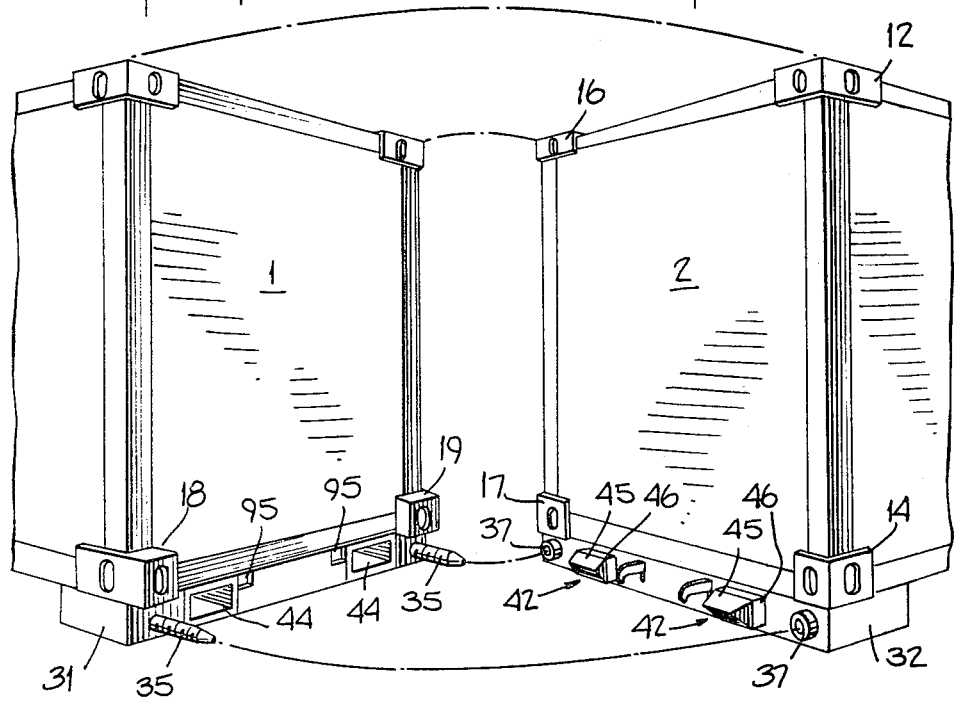
INVENTOR.
WILLIAM A. BERTOLINI
BY Kenyon & Kenyon
ATTORNEYS Nov. 26, 1968  W. A. BERTOLINI  3,413,016
MULTIPLE CHASSIS AND CONTAINER SYSTEM
Filed Nov. 24, 1967  4 Sheets-Sheet 2
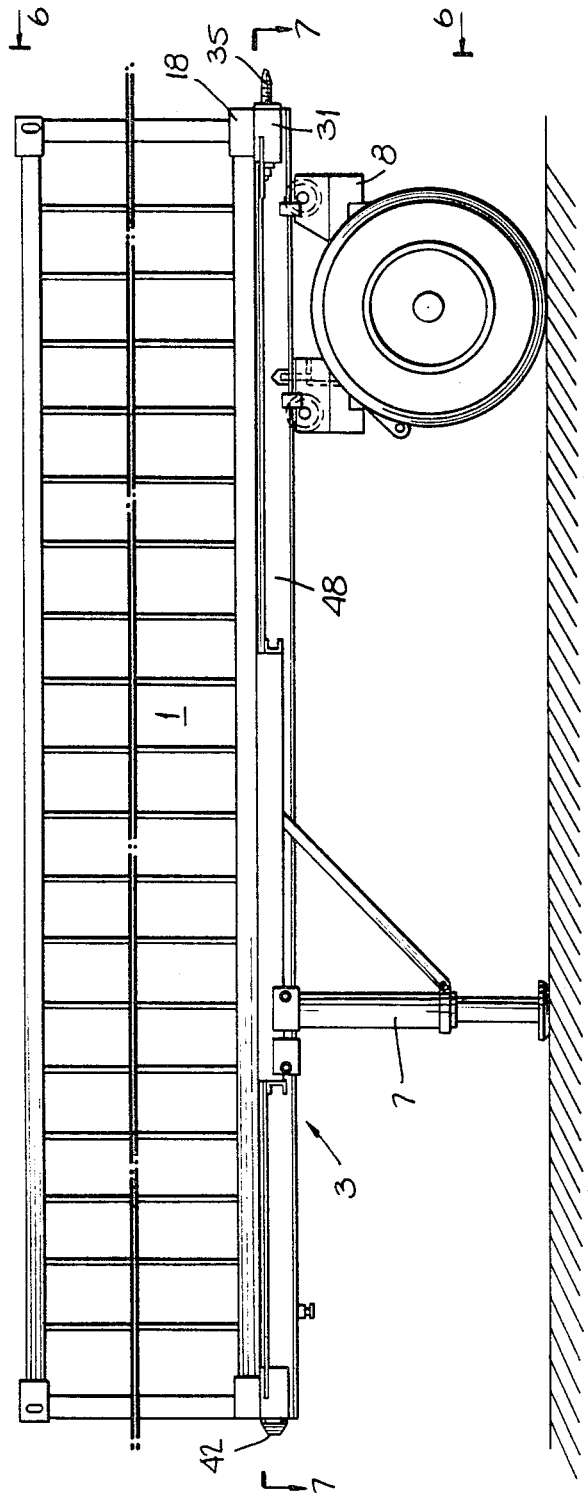
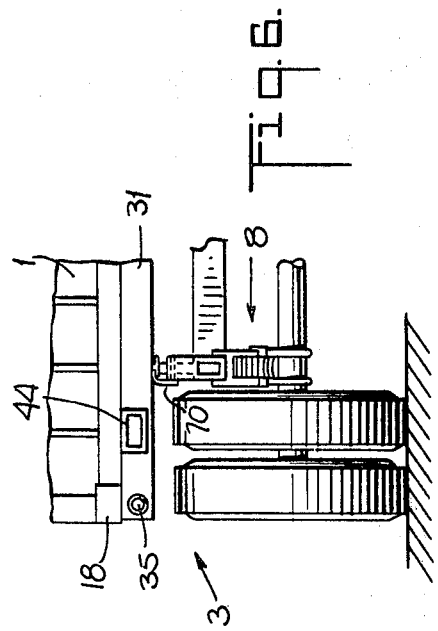
INVENTOR.
WILLIAM A. BERTOLINI
BY
ATTORNEYS

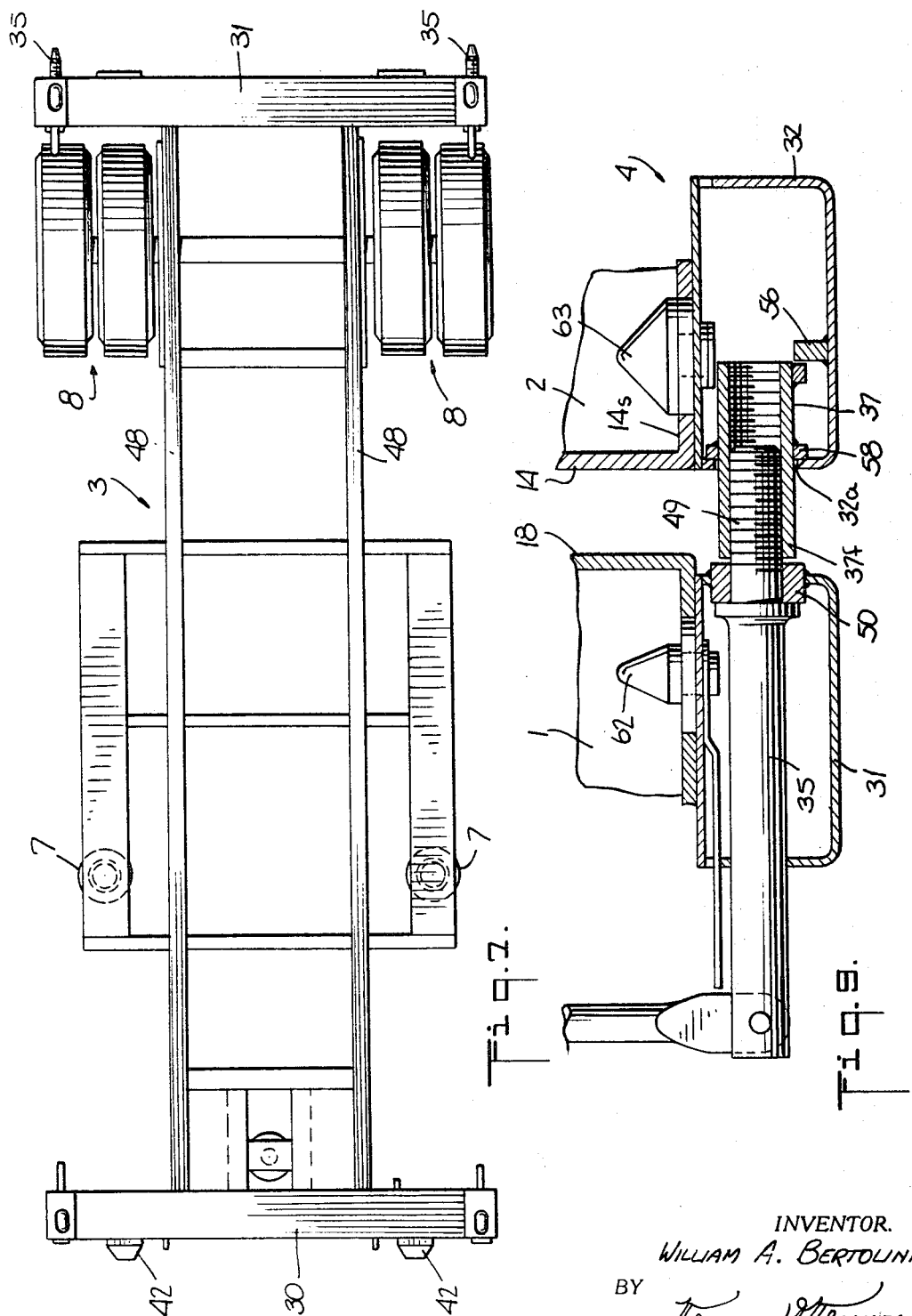

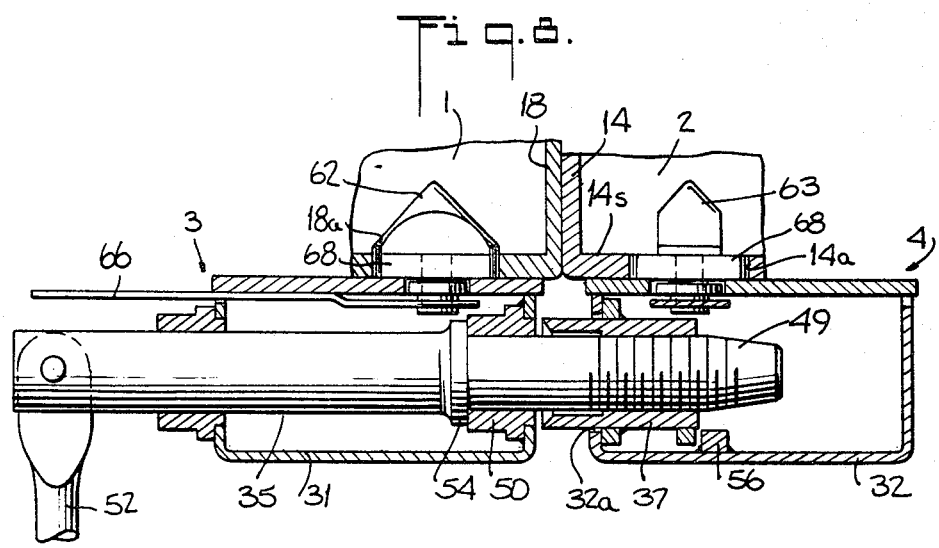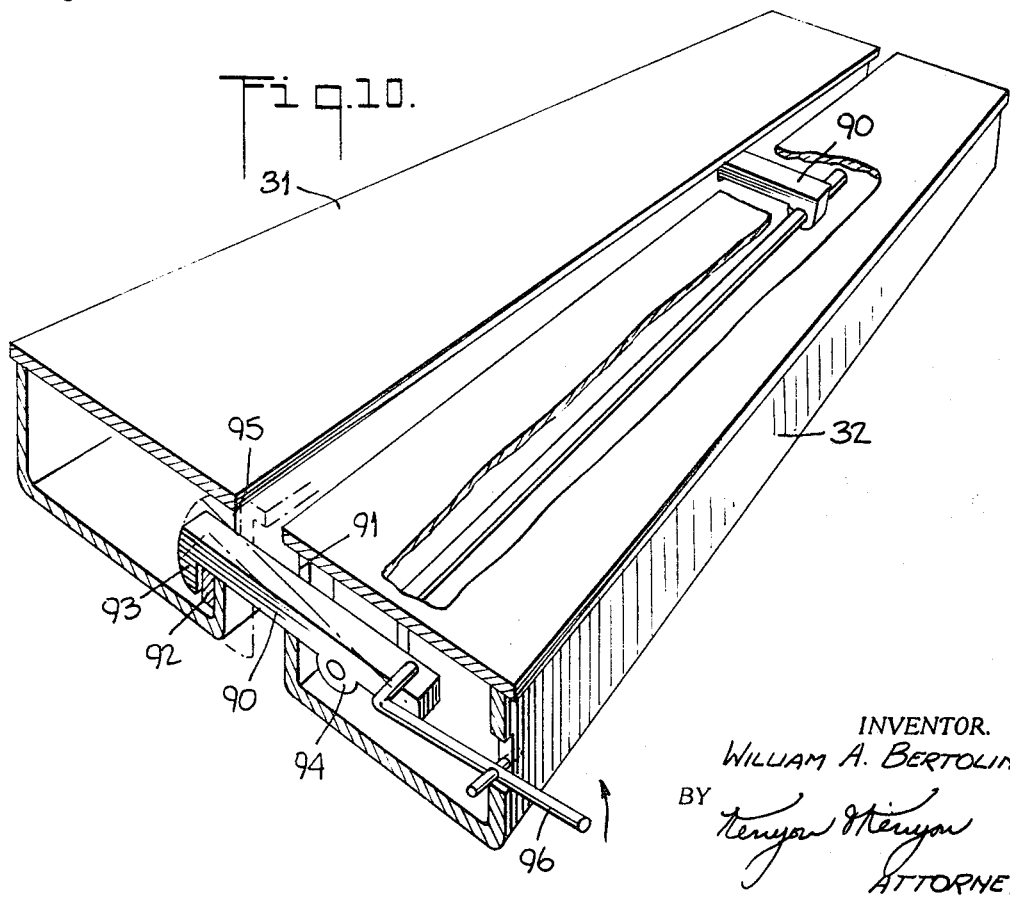

United States Patent Office 3,413,016
Patented Nov. 26, 1968

3,413,016
MULTIPLE CHASSIS AND CONTAINER SYSTEM
William A. Bertolini, Smoke Rise, N.J., assignor to
Theurer, Inc., Newark, N.J., a corporation of New
Jersey
Continuation-in-part of application Ser. No. 600,598,
Dec. 9, 1966. This application Nov. 24, 1967, Ser.
No. 685,694
13 Claims. (Cl. 280—415)

ABSTRACT OF THE DISCLOSURE

The disclosure contained in the following specification is of a technique for tying tractor-drawn chassis together so that connections are not required between the containers carried thereon and thus standard cargo containers may be employed. The chassis interconnection shown is a bolt and mating floating socket which when coupled together serve to carry tensile forces so that the front chassis can pull the rear chassis along, but which, because of the floating design, permit a degree of rotational movement in the longitudinal vertical plane between the two chassis thereby tied together.

---

This application is a continuation-in-part of Ser. No. 600,598 filed on Dec. 9, 1966 and entitled Multiple Chassis and Container System.

Background of the invention

This invention relates to a multiple chassis and container system and more particularly to a system capable of carrying a pair of standard containers on a pair of chassis tied together.

In recent years, cargo containers have been used more and more where several means of transportation are to be used, as, for example, transportation both by trailer truck and by ship. This has not been without its problems, especially when it comes to standardization of container design.

Probably the most useful length of container is the 20 foot container, yet for over-the-road purposes a 40 foot trailer is normally considered to be most efficient. However, in many situations 40 foot units are too long and not desirable. Consequently, it would be impractical to have chassis only of the 40 foot length. It is important, then, to have chassis which are capable of being used singly or together. When used in tandem, in conjunction with containers, they make up a 40 foot chassis supported at the rear by both bogies and in the front by the tractor.

Because of the resulting 40 foot span, it has been found necessary in the past when using two chassis in tandem to make the chassis of greater strength, and thus much heavier and more expensive than when either a single 20 foot or single 40 foot length chassis was used to carry 20 foot containers.

In order to avoid the use of such heavy and expensive chassis, the containers have been fixedly locked together at their abutting end faces in order to provide a rigid 40 foot container unit. Such an approach encounters the difficulty of accommodating to variations in the containers. Connecting the containers together to form a rigid single beam generates a problem in aligning the facing ends of the containers to one another and at the same time aligning each container to the holding means on its chassis. The tolerance limitations of even standardized containers such as those standardized by the United States of America Standards Institute (see USA Standard MH 5.1), are such that this alignment problem is severe. At best, it means that chassis have to be built with expensive and unwarrantable precision requirements.

Furthermore, the linking of the container units requires extra fixtures on the containers so that they may be interlocked. These fixtures are not standardized, may not be readily available, certainly do not exist on most containers in the field, and could not be expected to be interchangeable.

Accordingly, it is a major purpose of this invention to provide a multiple chassis and container system in which standardized and non-specialized containers may be employed.

It is a more particular purpose of this invention to provide such a system in which all of the design requirements to permit over the road hauling of the containers in tandem are part of the chassis design.

It is a further purpose of this invention to provide such a system with chassis that are of the standard 20 foot length and which need not be excessively heavy or complicated in design.

Accordingly, it is a related purpose of this invention to provide the above advantages in a simple and inexpensive design and avoids the need for non-standard, frequently unavailable loose parts.

It is a further purpose of this invention to provide the above purposes with a design that minimizes the amount of time required to couple and uncouple chassis and/or remove and replace containers.

It is thus a more specific purpose of this invention to provide these advantages in a means that permits one man to couple and uncouple the system and that allows him to work at ground level.

Considering the context in which this invention will be employed and the many and diverse places in which coupling and uncoupling will be undertaken, it is a further purpose of this invention to provide such a system as is foolproof, simple and self-evident.

It is a related purpose to provide a system that minimizes the risk that damage will be done if coupling is not properly made.

Brief summary of the invention

In brief, these advantages and objects are achieved in one embodiment by means of a bolt to floating socket tie between the facing adjacent ends of two chassis in tandem. The bolt that provides the tie between the two chassis in tandem is provided with sufficient strength so as to transmit the tension forces that pull the rear chassis after the front chassis. However, because of the floating socket arrangement, compressive and shear forces as well as bending moments are not and must not be transmitted through this bolt and socket arrangement. The adjacent facing ends of the two chassis in tandem are thus further provided with aligning gatherers to prevent the chassis from sliding vertically or laterally relative to one another so that the bolt and socket are not subjected to shear forces. When loaded, the containers carried on the chassis will tend to induce rotation of the two chassis relative to one another so that the two containers will bear against one another at the top and thereby prevent further sag at the junction of the two chassis.

As a consequence of this arrangement, each container can be locked to its own chassis by means of the bottom opening in the lower corner casting on the conainers. This lower corner opening has been standardized sufficiently with certain tolerances allowed, so that whatever adjustments are necessary to accommodate the necessary variations between the precise location of the lower corner opening on the container can be made by an adjustment in the spacing between the tied together chassis. This requires that under normal conditions, the facing adjacent chassis be tied together solely in tension (and particularly, not in compression) so that chassis adjustment can be made to compensate for variations in the lower corner casting opening position.

The drawings

These and other advantages of the invention will be more fully understood from the following detailed description and the accompanying drawings, in which:

FIG. 1 is an elevation of two containers, typically each 20 feet, mounted on their respective individual chassis;

FIG. 2 shows these containers with the chassis coupled and with the bogie of the forward chassis underneath the rearward chassis;

FIG. 3 illustrates one method of removal of the pair of containers from the chassis, as for example, when placed in the hold of a ship;

FIG. 4 is a perspective view of the inner ends of the two containers and chassis, swung apart to show the inter-connections in the preferred form of my invention (the supporting bogies are not shown); an alternate form of the invention allows the containers to be spaced 3" at the top and bottom, separate spacers or built in hinged spacers being required on the top;

FIG. 5 is a partial side view of one chassis and container showing the general construction of my invention;

FIG. 6 is a partial section on line 6—6 of FIG. 5, showing a portion of the bogie and bolster construction;

FIG. 7 is a plan view taken on line 7—7 of FIG. 5 showing further details of the chassis construction;

FIG. 8 is a partial section taken on line 8—8 of FIG. 7 giving details of a preferred means for tying the chassis to one another;

FIG. 9 is similar to FIG. 8, but shows a modified type of coupler where the containers are designed to be spaced apart; and FIG. 10 is a section showing a means to temporarily hold the chassis together until the screws can be engaged.

Detailed description

Considering the figures in more detail, in FIG. 1 there are disclosed two typical containers 1 and 2, each on its respective chassis 3 and 4. Chassis 3 includes foldable landing gear 7 and bogie 8. Chassis 4 includes foldable landing gear 9 and bogie 10. Chassis 3 and 4 are identical.

Each of the containers has top corner fittings at its upper four corners, illustrated, for example, by pickups 12 and 13 on container 2. They also each have bottom corner fittings in each of their respective four bottom corners; for example, corners 14 and 15 of container 2. These fittings are of standardized design. My invention makes it possible to employ not only standardized containers but any container which has the bottom face of the corner fittings standardized, without requiring special fixtures on the containers. This advantage follows from the fact that this invention permits coupling of the containers solely to their respective chassis and does not require container to container coupling.

In FIG. 2, the chassis 3 and 4 are shown joined at their inner ends by tying means 20. The forward end of chassis 3 is secured to tractor 21; and bogie 8 from chassis 3 has been slidably moved rearwardly so that it is just forward of bogie 10 and supports the rear end of chassis 4. As can be seen, landing gears 7 and 9 have been folded upwardly. The tying together chassis 3 and 4 produces, a single chassis arrangement having a span twice the length of the individual chassis. If each were 20 feet, the joined chassis would span 40 feet, a convenient length for highway use.

No fixtures are used on containers 1 and 2 to unite them or to form a single dual container, but rather, as is described below each container is secured to its respective chassis and the chassis themselves are tied together. The strength of the container walls provides the extra strength needed by the chassis for the long span between the tractor 21 and the rear bogies 8 and 10.

The sole means on the containers 1 and 2 for securing them to the chassis 3 and 4 are the bottom corner fittings which are standardized equipment on standard containers.

When the tractor-trailer combination arrives at its destination, the containers may be removed singly or together by means of tandem lifting spreaders. Spreaders may be readily affixed to the top corner fittings, as shown in FIG. 3, and the containers 1 and 2 lifted by slings.

FIG. 4 discloses the coupling structures used in the preferred form of my invention. Container 2 is shown with the corner pickup fittings 12 and 16 of standard design, and bottom corner fittings 14 and 17, also of standard design. Container 1 has similar bottom corner fittings 18 and 19.

The bottom corner fittings 14, 17, 18 and 19 are secured to their respective chassis 3 and 4 by means of twist locks (as may be seen in FIG. 8).

Each chassis includes a pair of transverse bolster members, one bolster at each end of each chassis. FIG. 4 shows a rear bolster 31 on the front chassis 3 and a front bolster 32 on the rear chassis 4. Of course, the chassis 3 and 4 are identical and interchangeable but, as is evident in FIG. 4, the front bolster (such as the bolster 32) on each chassis supports and has attached to it different equipment than does the rear bolster (such as the bolster 31). Thus the front bolster 30 (shown in FIG. 7) of the chassis 3 is identical to the front bolster 32 of the chassis 4, and the rear bolster (not shown) of the chassis 4 is identical to the rear bolster 31 of the chassis 3.

With reference to FIG. 4, secured to the respective bolsters 31, 32 are the previously referred to tying means 20 together with gatherers to assist in aligning the chassis and to carry shear loads. The tying means 20 includes bolts 35 on the rear bolster 31 and floating threaded mating sockets 37 on the front bolster 32. FIGURE 8 shows the bolt 35 and socket 37 connections in greater detail and is described below. Alternatively, to provide ready interconnection, regardless of which ends of the chassis face each other, each bolster could carry one bolt and one socket.

A pair of gatherers 42 is mounted on the front bolster 32 and a pair of mating receptacles 44 is included in the rear bolster 31. Tapered pyramid like ends 45 on the front of the gatherers 42 provide the lead in necessary to gather properly. The gatherers 42 also have a flat portion 46 on the top and bottom which when engaged with the receptacles 44 provide a means of shear transfer from one chassis to the other. The purpose of the gatherers is to cause alignment of the two chassis as they are brought together so that the tying means will readily mesh and also to carry shear after they are meshed. The gatherers 42 and the mating receptacles 44 are complementary to one another except that the gatherers 42 include surfaces oblique to the longitudinal axis of the chassis in order to guide the gatherers 42 into the receptacle 44. Thus, the gatherers 42 serve to align the chassis 3 and 4 as they are brought together in end-to-end abutment.

The gatherers 42 carry shear forces only. Telescopic action precludes the carrying of tensile or compression forces. Indeed, it is important that the gatherer receptacles 44 be deeper than the height of the gatherers 42 so that no compression force is transmitted through the gatherers. Because the gatherers 42 carry both lateral and vertical shear, the tying means does not have to be designed to be designed to carry any forces except tension. Thus the simple tying means 20 design shown herein becomes possible and bolts 35 only two and one-half inches in diameter have been found satisfactory.

FIGS. 5 and 6 provide further detail of the structure of the chassis. Chassis 3 is illustrated, though both chassis 3 and 4 are the same. Positioned below chassis 3 is retractable landing gear 7, pivoted so that it can fold up longituinally underneath the chassis. Bogie 8 is mounted beneath chassis 3 on a pair of parallel, longitudinal rails 48. The bogie 8 is mounted to rails 48 so that it may be moved longitudinally along rails 48, either by sliding or rolling and be secured in any of several positions under chassis 3. By juxtapositioning the rails 48 of chassis 3 with the rails of chassis 4, the bogie 8 may also be moved to the other chassis 4, as shown in FIG. 2.

The construction of chassis 4 is similar to that of chassis 3.

FIG. 7 shows a section along lines 7—7 of FIG. 5, and is a plan view of chassis 3 with container 1 removed. The relative positions of bolsters 30, 31, parallel rails 48, landing gear 7, bogie 8, bolts 35 and the gatherers 42 are shown.

FIG. 8 is a cross section along the line 8—8 in the lower right hand corner of FIG. 7 in order to more completely show the details of the tying arrangement employed. In FIG. 8 not only is the bolt 35 section portion of the tying arrangement shown but the threaded socket 37 portion, which is part of the chassis 4, is also shown.

As may be seen from FIG. 8, the bolt 35 is retractable to minimize damage to it when uncoupled and the bolsters 31, 32 are tubular in cross section. The bolt 35 is mounted in the bolster 31 and extends through the bolster 31 so that the screw portion 49 of the bolt 35 extends out the rear of the bolster through a collar 50. The other end of the bolt 35 extends out of the front of the bolster 31 and in the preferred design shown, includes a swivable permanently attached handle 52 which when rotated 90° to the axis of the bolt 35 allows a sufficient moment arm to rotate the bolt under load. Such a design eliminates the necessity for a wrench. A shoulder 54 on the bolt 35 bears against a forwardly facing surface on the collar 50 when the chassis are tied together.

The socket portion 37 of the tying means is mounted in the forward bolster 32 of the rear chassis 4 and is internally threaded to accept the threaded portion of the bolt 35. The socket 37 is retractable up to the extent determined by the stop 56. The socket 37 protrudes forward from the bolster 32 through an oversize opening 32a. Thus the socket 37 is capable of a limited amount of rotation in the plane of the paper as shown in FIG. 8, and is also capable of being aligned with the bolt 35. The socket 37 is a floating socket in that it is not firmly restrained in any directions by its mount, the bolster 32. To a limited extent, the socket 37 has the full six degrees of the freedom of motion when not engaged by the bolt 35. When the socket 37 is engaged by the bolt 35 and when the bolt 35 is transmitting the tension force required for supporting the long 40 foot span and for pulling the chassis 4 forward then the shoulder 58 on the socket 37 will bear against the forward wall of the bolster 32 to transmit necessary forces to pull along the chassis and the associated container. The socket shoulder 58 is squared so that the amount of rotation of the socket 37 about its longitudinal axis will be limited and thus the screwing of the bolt 35 into the socket 37 will be facilitated.

The bolt 35 is rotated until the corner fittings 14 and 18 bear against each other. Similar tying means on the other ends of the bolsters 31 and 32, are also comparably coupled. In this way, chassis 3 and 4 are tied together. The tying means must be strong enough to withstand the tension forces created by the weight of the containers 1 and 2 resting on their respective chassis 3 and 4. The tying means between chassis and the twist lock means for securing the containers to their respective chassis are so positioned relative to one another that the containers will be able to lean against one another within the degree of rotational movement in the vertical longitudinal plane that is permitted by the floating socket 37.

The tying means (bolt 35 and socket 37) are designed to carry tension only. The oversized opening 32a through which the socket 37 is mounted precludes shear transfer. Compression is impossible since the corner fittings (such as 14 and 18) will abut each other and transmit compression before the socket 37 contacts the stop 56 which is located well within the bolster 32.

With the chassis so coupled, bogie 8 under chassis 3 may be moved down rails 48 and along the comparable rails of chassis 4, and be positioned adjacent to bogie 10, as shown in FIG. 2.

Since the containers 1 and 2 are secured to their respective chassis 3 and 4 they will then lean against one another at their tops and the structural strength of the containers will reinforce the chassis.

FIG. 8 also shows the twist lock means 62, 63 for securing the containers 1 and 2 to their respective chassis 3 and 4. In FIG. 8, the twist lock 62 is shown in unlocked position and the twist lock 63 in locked position. The container 2, for example is secured to its chassis 4 through the bottom opening 14a of its lower corner fitting 14. A known type of twist lock coupling 63 extends through the opening 14a to couple the bolster 32 to the fitting 14 thereby holding the container 2 down on the bolster 32. As is known in the art, and therefore not illustrated herein, the bottom opening 14a is an elongated opening having its longest direction in the plane of the paper as shown in FIG. 8 and its shortest direction perpendicular to the plane shown in FIG. 8. Thus when the twist lock 62 is in the position shown in relation to the container 1, the twist lock 62 fits through the opening 18a. When the twist lock is rotated 90°, as shown by the relation of the twist lock 63 to the opening 14a in container 2, the downwardly facing surface of the twist lock 63 will engage the inner upwardly facing surface 14s of the corner casting 14 and thus prevent removing the container 2 from the chassis 4. The position of the twist lock 62 is controlled through a handle 66 that permits the operator to rotate the twist lock and thus couple and uncouple the containers to their respective chassis. This twist lock 62, 63 coupling is normally provided at each of the four corners of each container.

A non-rotatable boss 68 extends around the center of the shank of each twist lock 62, 63 and is welded to the associated bolsters 31 and 32 for the purpose of transmitting forces from the chassis 3 and 4 to their respective containers 1 and 2 for the basic purpose of carrying the containers along with the chassis.

FIG. 9 illustrates a second embodiment of the tying means 20 for coupling adjacent chassis units 3 and 4 together. The tying means illustrated in FIG. 9 is basically similar to the preferred means illustrated in FIG 8 and thus the same reference numerals are employed. The major difference between the FIG. 9 and the FIG. 8 tying means is that the FIG. 9 tying means does not bring the corner castings, 14 and 18 for example, into contact with each other. The socket 37 has a forward extension 37f, in the FIG. 9 embodiment, which effectively prevents the corner castings from coming into contact. This embodiment may be employed where for some reason it is desired to leave a gap between the two containers. In such instances, the containers should be supplied with extension devices such as spacers so that when the containers lean upon one another, as they are intended to do in the system of this invention, the container walls will lean on the snubbers and thus will be held apart by the amount of gap desired.

As shown in FIG. 10, the chassis 3 and 4 may be initially held together by a latching pawl arrangement. A pawl 90 is pivotally mounted on the bolster 32 and passes forwardly through an opening 91 in bolster 32. A latch or seat 93 on the end of pawl 90 passes through an opening 95 in the bolster 31 and engages with a shoulder 92 on bolster 31. The pawl 90 is pivotally mounted on a fulcrum 94 intermediate its length. The pawl is moved between its locked and unlocked positions by an actuator 96, and so either engages or disengages with shoulder 92. For example, the pawl may be moved by the actuator 96 to the phantom position, as shown in FIG. 10 for disengagement with the shoulder 92.

The pawl arrangement of FIG. 10 is valuable in that it allows the chassis 3 and 4 to come close together through force of impact to thereby inter-engage. After the pawls 90 have locked, the chassis may be tied together with tying units 20 such as that shown in FIG. 8. As the two chassis are brought closer together by means 35 and 37, the pawl 90 no longer contacts the shoulder 96 and hence transmits no loads.

The two inter-engaged chassis 3 and 4 with their respective containers 1 and 2 may be drawn by tractors, such as tractor 21, to the destination. At the destination, the containers may be removed jointly, using double spreaders on a crane, after uncoupling the respective bottom corner fittings, such as 14 and 17 on container 2, from the chassis. The double spreaders may readily lift the two 20 foot containers at one time. Alternatively, the containers 1 and 2 may be removed separately.

Instead of moving the containers from the chassis at the destination, the chassis may be again split by replacing the bogies 8 and 10 and disengaging the interlocking means 35 and 37. The single containers on the single chassis may be drawn by separate tractors.

From the foregoing description, the various advantages provided by the invention can be fully understood. A multiple chassis and container system, arranged in tandem, is provided, in which the internal strength of the containers is utilized to enhance or increase the strength of the span of the tandem chassis without the necessity for inter-engaging the containers themselves and in which a non-rigid coupling between chassis is provided. As a consequence, a standardized containers, with no special fixtures, may be used. The system of this invention has great flexibility; and the chassis and containers may be easily coupled or uncoupled for any purpose desired. For example, the chassis and containers may be easily arranged into 20 foot units, as well as 40 foot units, or even 60 foot units, when needed. Conversely, the chassis and containers may be uncoupled from a 40 foot unit, or a 60 foot unit respectively to a 20 foot unit or a 40 foot unit. Also, a single 20 foot unit may be removed from either a 40 foot or a 60 foot unit and drawn by itself to its destination. This is easily accomplished after one of the bogies positioned under the rear chassis is moved to under the adjacent chassis along common rails and the interlocking means of the chassis are disengaged. Moreover, the containers, after being uncoupled from their respective chassis, may be easily removed together or singly, and placed in a certain area or in another means for further transportation, such as a ship, an airplane, or a railroad car. This invention may well apply to a plurality of containers and chassis, and not necessarily only two or three.

Thus it may be seen from the above description of the purposes outlined in the beginning of this specification are achieved by means of this invention. The containers 1 and 2 themselves are not linked together at all. That is one of the reasons why the standardized container unit may be employed. The chassis design is simple and relatively inexpensive. The design is such that it is self-evident as to how coupling is to be achieved and any error in the conception of how coupling between chassis is to be achieved will not result in damage to the chassis involved. The chassis are of such a nature that no special reinforcement is required because once the containers are loaded, the tied together chassis will permit sufficient sag, where such is necessary, at the juncture between two chassis 3, 4 so that the containers 1, 2 will lean against one another to provide an over all reinforcement that permits over the road hauling of two separate containers on two tied together chassis.

This invention has been described with reference to specific apparatus. Numerous variations may be made, however, without departing from the scope of this invention.

For example, although less convenient, it would be possible for the bolt portion 35 of the tying means 20 to be the floating portion rather than the socket portion 37. Or, both portions of the tying means could be made floating.

What I claim is:

1. In a multiple chassis and container system including a pair of chassis arranged in tandem and a container mounted on each of the chassis, the improvement comprising:

tying means at the facing ends of each of the chassis, said tying means including a first mating member on the end of one of the two chassis being tied together and a second mating member complementary to said first mating member on the other one of the two chassis being tied together, said mating members being capable of drawing said chassis together in tension with sufficient strength to resist the tension forces created by the weight of the containers on said chassis in the absence of means coupling the containers directly to one another, at least one of said mating members being pivotally mounted to its respective one of said chassis to permit rotation in a vertical longitudinal plane of said one of said mating members relative to said chassis to which it is mounted.

2. The improvement of claim 1 further characterized by: gatherer means at the facing ends of each of the chassis tied together, said gatherer means including at least one gatherer and one gatherer receptacle complementary to one another so that when said gatherer is inserted into said receptacle said gatherer means will resist lateral and vertical movement of said chassis relative to one another.

3. The improvement of claim 2 wherein one of said mating members is a bolt and the other of said mating members is a socket adapted to engage said bolt.

4. The improvement of claim 3 wherein said bolt and socket members are threaded.

5. The improvement of claim 3 wherein the mounting of said socket member to its chassis is a floating mount.

6. The improvement of claim 5 further characterized by:

a pawl pivotally mounted to a first one of said chassis, an engaging shoulder in the second one of said chassis, said shoulder being adapted to receive said pawl to hold said chassis together in tension, said second one of said chassis including an opening for receiving the engaging end of said pawl, said opening being large enough so that said pawl may be rotated from an engaging position wherein said pawl engages said shoulder to a disengaging position wherein no tension is transmitted from chassis to chassis to said pawl.

7. The improvement of claim 1 wherein one of said mating members is a bolt and the other of said mating members is a socket adapted to engage said bolt.

8. The improvement of claim 7 wherein said bolt and socket members are threaded.

9. The improvement of claim 1 wherein the mounting of at least one of said members to its chassis is a floating mount.

10 The improvement of claim 1 further characterized by:

a pawl pivotally mounted to a first one of said chassis, an engaging shoulder in the second one of said chassis, said shoulder being adapted to receive said pawl to hold said chassis together in tension, said second one of said chassis including an opening for receiving the engaging end of said pawl, said opening being large enough so that said pawl may be rotated from an engaging position wherein said pawl engages said shoulder to a disengaging position wherein no tension is transmitted from chassis to chassis to said pawl.

11. A multiple chassis and container system comprising:

a first chassis,
a second chassis,
tying means between said chassis to draw said chassis together solely in tension, said tying means pivotally mounted to at least one of said chassis to permit rotation of said chassis relative to one another in a vertical longitudinal plane,
a first container mounted on said first chassis, and coupled solely to said first chassis, and
a second container mounted on said second chassis and coupled solely to said second chassis, whereby rotation of said chassis relative to one another in said vertical longitudinal plane will result in rotation of said containers relative to one another in said vertical longitudinal plane, 12. The system of claim 11 further characterized by:
gatherer means at the facing ends of each of the chassis tied together, said gatherer means including at least one gatherer and one gatherer receptacle complementary to one another so that when said gatherer is inserted into said receptacle said gatherer means will resist lateral and vertical movement of said chassis relative to one another.

13. The system of claim 12 wherein said tying means is a bolt and socket combination, said bolt being mounted to one of said chassis and said socket benig mounted to the other one of said chassis.

References Cited
UNITED STATES PATENTS

| | | |
|---|---|---|
| 2,097,113 | 10/1937 | Bradley. |
| 3,004,772 | 10/1961 | Bohlen et al. _____ 280—415 |
| 3,102,738 | 9/1963 | De Roshia _____ 280—415 |
| 3,105,703 | 10/1963 | Rittenhouse _____ 280—415 |
| 3,294,420 | 12/1966 | Martin _____ 280—415 |
| 3,321,214 | 5/1967 | Tantlinger _____ 280—415 |

LEO FRIAGLIA, *Primary Examiner.*